Aug. 27, 1968 G. KRAUSE 3,399,272

TELEVISION SIGNAL RECORDING AND REPRODUCING APPARATUS HAVING CARRIER FREQUENCY HIGHER THAN FIRST APERTURE NULL FREQUENCY

Filed July 7, 1965 3 Sheets-Sheet 1

Inventor:
Gerhard Krause
by Michael J. Striker
Attorney

Aug. 27, 1968 G. KRAUSE 3,399,272

TELEVISION SIGNAL RECORDING AND REPRODUCING APPARATUS HAVING CARRIER FREQUENCY HIGHER THAN FIRST APERTURE NULL FREQUENCY

Filed July 7, 1965 3 Sheets-Sheet 2

Inventor:
Gerhard Krause
by Michael J. Striker
Attorney

Inventor:
Gerhard Krause
by Michael J. Striker
Attorney

United States Patent Office 3,399,272
Patented Aug. 27, 1968

3,399,272
TELEVISION SIGNAL RECORDING AND REPRODUCING APPARATUS HAVING CARRIER FREQUENCY HIGHER THAN FIRST APERTURE NULL FREQUENCY

Gerhard Krause, Darmstadt, Germany, assignor to Fernseh G.m.b.H., Darmstadt, Germany Filed July 7, 1965, Ser. No. 470,080
Claims priority, application Germany, July 11, 1964, F 43,411
13 Claims. (Cl. 178—6.6)

Figure 1:
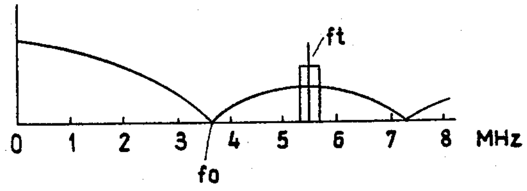

This invention relates to apparatus for the recording and reproducing of video and audio signals, especially for the magnetic recording of a television transmission taken from a television receiver, and for the reproduction of the recording on a television receiver.

It is already known to record television signals on magnetic tape. Owing to the wide frequency range of television signals, which extends from some 50 c./s. to 5 mc./s., on the one hand in order to obtain the necessary high relative velocity between transducer heads and tape recording has usually been effected by means of rotating heads in tracks transverse or inclined to the length of the magnetic tape, and on the other hand in order to reduce the ratio between the highest and the lowest frequencies to be recorded the television signal has usually been transformed into a carrier-frequency, as a rule frequency-modulated signal.

It has also previously been proposed to effect the recording in longitudinal tracks upon a magnetic tape by means of fixed heads. As compared with the apparatus with rotating heads the latter type of recording apparatus is characterized by very simple construction, similar to that of a sound tape recorder, and is therefore especially suitable for use as a domestic recorder.

For the complete recording of a television transmission it is necessary to record the audio signals in addition to the vision signals.

It is therefore a main object of the invention to provide an apparatus for recording and reproducing the signals of a complete television program, consisting of the picture signal and the accompanying audio signal.

It is a further object of the invention to provide an arrangement of the type mentioned which is very simple in its structure and reliable in operation.

The invention arises from the realization that it is possible to record the audio signal even above the null point of the frequency characteristic of the magnetic recording means, since owing to the narrow bandwidth of the audio signal as compared with the video signal and because of the large modulation coefficient, the amplitude of the work signal must be considerably lower than that of the video signal (by up to two powers of ten).

According to the present invention, in apparatus for the magnetic recording of the video and audio signals of a broadcast television transmission of the intercarrier-sound type the video signal is substantially recorded below and the difference carrier frequency modulated with the audio signal is recorded above the first null point in the frequency characteristic of the magnetic recording apparatus.

The arrangement according to the invention makes it possible to record the complete demodulated signal of a television transmission, consisting of a video and an audio signal, in one track on a magnetic tape by means of only one magnetic head. The demodulated television signal, which comprises the video signal and the frequency-modulated intercarrier sound signal, need not therefore undergo any further transformation, but may be applied directly to the recording head just as it is taken from the demodulator of a television receiver. A further advantage is that only a single amplifier is necessary for recording and playback.

It may in many cases be advantageous to transpose the complete demodulated television signal, consisting of the video signal and the frequency-modulated audio signal, into a somewhat higher frequency range, in order to improve the efficiency of recording for the lowest frequencies in the television signal. For example, the complete television signal may be shifted some 100 kc./s. higher in frequency. This case also lies within the scope of the invention, since shifting of the overall frequency range by a negligible amount retains the basic advantage of being able to effect the recording of the video and audio signals in a single track by means of one magnetic head.

In the arrangement according to the invention the bandwidth of the video signal is reduced as compared with the full bandwidth of 5 mc./s. to, for example, 3 mc./s. Since however the highest frequencies in the video signal appear relatively seldom, satisfactory reproduction results even with the reduced bandwidth, the resolution being merely reduced slightly, which appears acceptable when the quality requirements are not extremely high, for example, in domestic recording apparatus.

In direct recording of the video signal without frequency transposition an inductive magnetic head supplies a very low output voltage when playing back the lower video frequencies. According to an extension of the invention, pickup for direct recording of the video signals is effected by means of a Hall effect transducer head, which is known to have the characteristic that the output voltage is independent of the rate of alteration of field strength.

The reproduction of a television transmission stored in accordance with the invention may be effected with the aid of a television receiver, which may be the same apparatus which provided the signal which was recorded. The television signal taken from the magnetic tape can be fed into the video amplifier following the demodulator of the receiver. Since as a rule the video amplifier contains only one or at the most two amplifier stages, the voltage supplied by a magnetic transducer head is insufficient to drive the video amplifier; an additional preamplifier is therefore necessary.

According to an extension of the invention the signal reproduced from the magnetic tape is transformed into a carrier-frequency amplitude modulated signal, the carrier frequency may then correspond with that of a broadcast television channel. This carrier-frequency signal may then be fed into the high-frequency section of the receiver, e.g., by way of the aerial connection, so that in this manner the whole gain of the receiver is made use of and a preamplifier may often be dispensed with. The conversion of the signal into a carrier-frequency signal may be effected by means of a simple, low-power auxiliary oscillator. When using a Hall-effect head for playback the conversion may be effected by feeding the Hall head with an alternating current of the carrier frequency.

Playback of the recorded signal may also be effected by means of an even-harmonic head, the alternating current for feeding the harmonic head being given a frequency equal to half the carrier frequency of a television channel.

The particular simplicity of the arrangement is accompanied by difficulties. One of these difficulties is that timing errors result from the unavoidable fluctuations in the speed of the tape, which for receivers with flywheel synchronization give rise to a disturbed picture due to rapid irregular movement of the lines in the horizontal direction (jitter). With direct recording of the picture signal or with the recording of an amplitude modulated signal transposed in frequency, the further difficulty arises that the signal amplitude may undergo substantial fluctuations during the playback of the signal from the tape, which arise from slight alterations in the separation of the gap in the magnetic head from the magnetic record layer.

To equalize these fluctuations in amplitude in accordance with a further extension of the invention the difference carrier contained in the reproduced signal is employed as a pilot tone, by deriving from the audio carrier separated from the signal by rectification a control signal which alters the transmission factor for the whole television signal in such a manner as to reduce the variations in amplitude. The direct voltage developed by the FM demodulator (ratio detector) of the television receiver may be used as the control voltage.

To compensate the picture disturbance (jitter) in receivers with flywheel synchronization in accordance with a further feature of the invention, there is derived from the voltage which is obtained by phase comparison of the line synchronizing impulses contained in the video signal and the line synchronizing impulses taken from the scan generator in the receiver, and which is employed after passing through a filter to control the frequency of the horizontal scan generator, a further control voltage derived by way of a filter of shorter time-constant, so that this additional control voltage can follow even rapid alterations in the relative phases of the compared signals. This additional control voltage may be employed to alter the phase of the control impulses for the line output stage.

Figure 2:
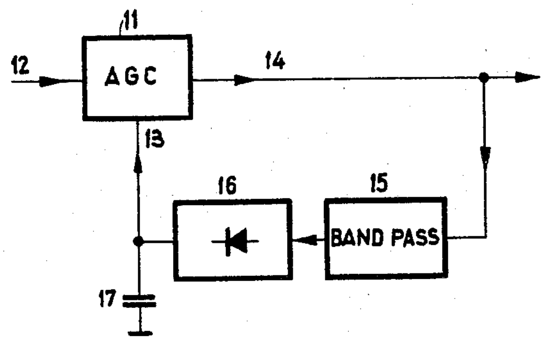
Figure 3:
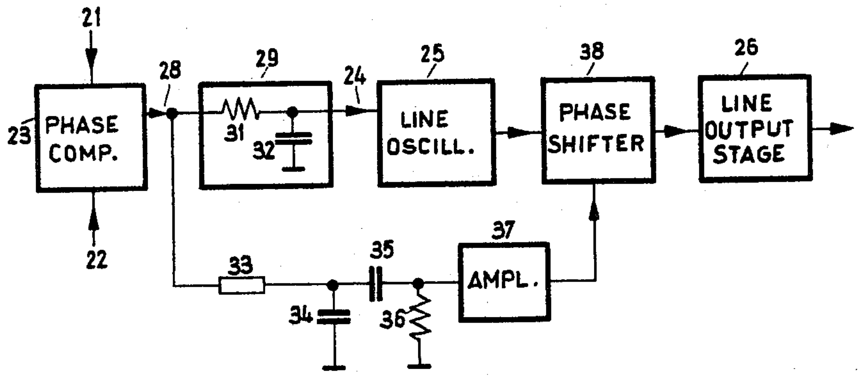
Figure 4:
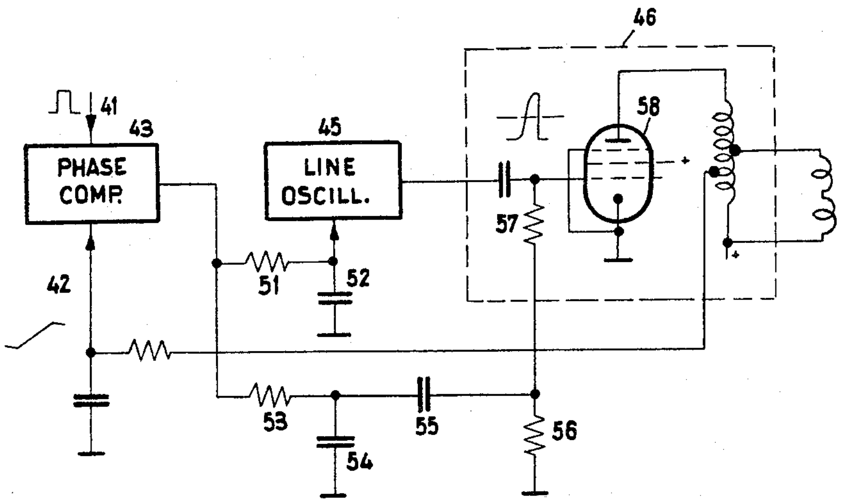
Figure 5:
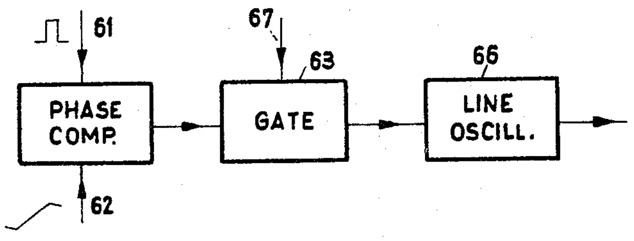
Figure 6:
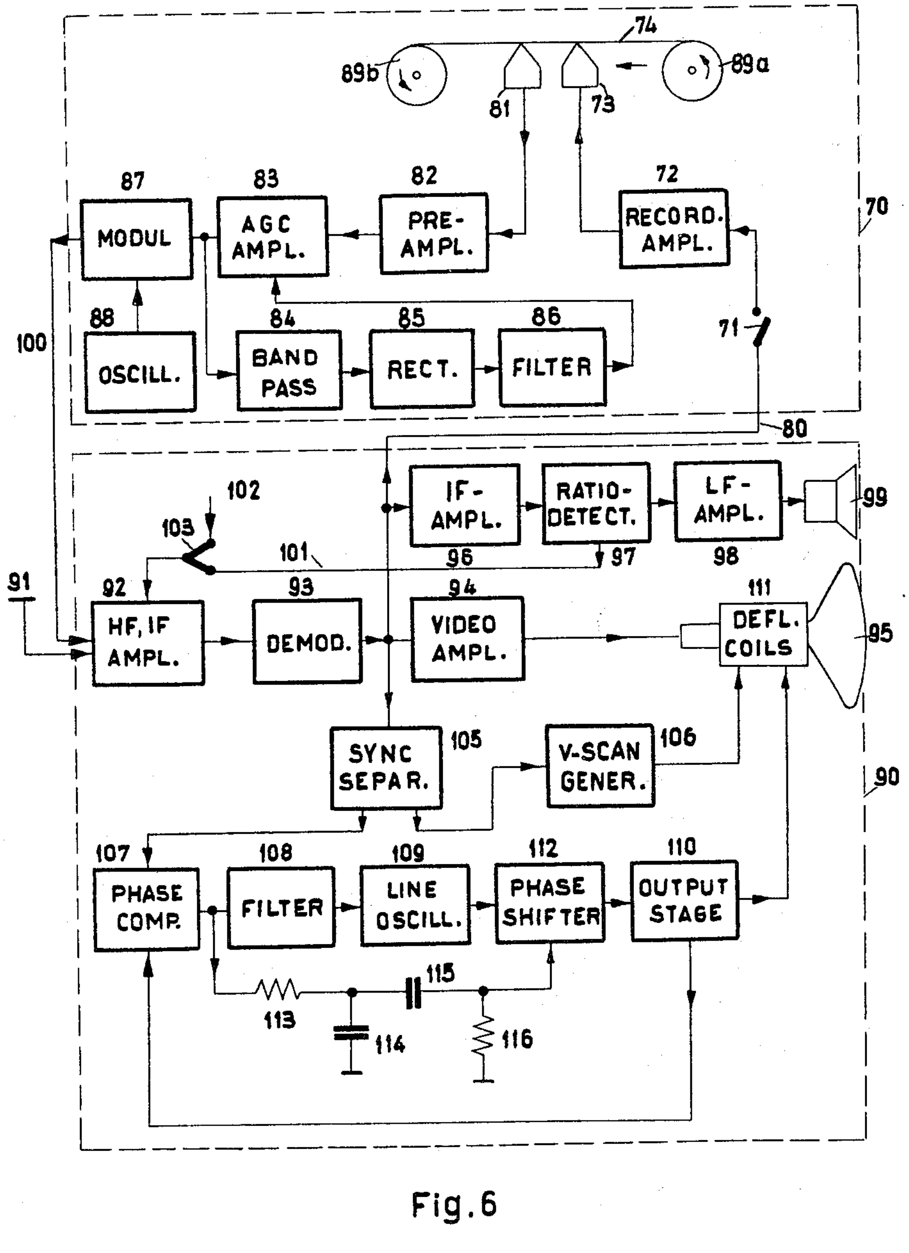

The above and still further features, objects and advantages of the present invention will become more apparent upon consideration of the following detailed disclosure of a specific embodiment thereof, especially when taken in conjunction with the accompanying drawings, wherein:

FIG. 1 shows by way of the example the frequency response of one embodiment of magnetic recording apparatus in accordance with the present invention, FIG. 2 is a schematic diagram illustrating apparatus for equalizing fluctuations in signal amplitude in apparatus according to the invention, FIG. 3 is a schematic diagram of apparatus according to the invention in which timing errors in the signal played back from magnetic tape may be equalized, FIG. 4 is a partly schematic circuit diagram of an alternative form of apparatus according to the invention in which timing errors are equalized, FIG. 5 is a schematic diagram of apparatus according to the invention in which line synchronization is effected directly, and FIG. 6 is a block schematic diagram of an arrangement according to the invention for the recording and playback of the video and audio signals of a television transmission by means of a television receiver.

FIG. 1 shows the frequency characteristic of a magnetic signal storage device suitable for carrying out the invention. This is chosen so that the difference carrier, which is modulated with the audio signal of the television transmission, and which may, for example, have a frequency of 5.5 mc./s., lies above the first null point in the frequency characteristic. The first zero point is preferably so positioned, by suitable choice of the tape speed and of the head dimensions, that the difference carrier approximately coincides with the first maximum above the first null point. The first null point may for example occur at approximately 3.6 mc./s. Below this null point lies the region in which the video signal of the television transmission is recorded. Thus video frequencies up to about 3 mc./s. can be recorded with acceptable efficiency, which is sufficient for a good television picture if the requirements as to quality are not set too high. By the use of the present invention it is therefore possible to construct a magnetic tape machine by which it is possible with the simplest construction and an acceptable tape speed of e.g., 3 meters/second to record the complete television signal including the audio signal in one track on the magnetic tape.

In FIG. 2 the television signal taken from the magnetic tape is applied to the input 12 of an adjustable member 11, which varies the transmission factor of the television signal applied at 12 in accordance with a control voltage applied to the adjustable member 11 by way of a lead 13 in order to compensate for amplitude fluctuations. The adjustable member 11 may in the simplest case be a gain-controlled amplifier, the gain of which is altered by the control voltage. To generate the control voltage the frequency modulated difference carrier is separated by means of a band-pass filter 15, from the complete television signal at the output 14 of the controlled member 11. From this difference carrier there is derived by means of a control rectifier 16 a control direct voltage proportional to the amplitude of the difference carrier, which after smoothing in a filter, indicated by a capacitor 17, is applied at 13 to the controlled member 11. In this manner the amplitude fluctuations of the whole signal are reduced and, by the choice of an appropriately high loop gain in the control circuit, may be diminished to a value which in practice is not longer disturbing.

FIG. 3 shows schematically an arrangement for equalizing timing errors in a television signal taken from a magnetic tape by additional measures in a television receiver of otherwise conventional construction used for its reproduction. The receiver contains a line oscillator 25, which drives a line output stage 26 to generate the scan current for the horizontal deflection of the electron beam in the picture tube. In the flywheel synchronization circuits usually employed, the line oscillator 25 is continuously adjusted by a votage applied to it at 24, the value of which depends upon the phase difference between the line synchronizing impulses contained in the television signal and those derived from the line oscillator. The control voltage is generated by a phase comparator 23, to which on the one hand the line synchronizing impulses separated from the television signal are applied at 21 and on the other hand there are applied at 22 comparison impulses at the frequency of the line oscillator 25.

The voltage dependent upon the phase difference between the synchronizing impulses which is supplied by the phase comparator is finally taken through a filter 29 before it is applied to the line oscillator 25. The filter, which in the figure is symbolized by a resistor 31 and a capacitor 32, has the known purpose of allowing only slow, continuous alterations in the frequency of the line oscillator and to give the arrangement of interia necessary for the desired flywheel effect.

Owing to this inertia, sudden irregular timing errors, such as appear in television signals taken from magnetic tape owing to small fluctuations in tape speed, have no effect upon the line oscillator so that the timing errors are disturbingly noticeable in the television picture through irregular sudden horizontal shifts in the lines.

In contrast to the usual application of a television receiver for the reception of broadcast television transmission, in the application of the receiver for the reproduction of magnetically stored television transmissions the line oscillator may also follow rapid irregular fluctuations in the position of the synchronizing pulses in the television signal.

In order to produce this result even in a television receiver with flywheel synchronization, there is derived from the voltage developed in the phase comparison stage 23 a second control voltage taken by way of a filter with a shorter time-constant, which can follow also rapid phase differences. The filter of shorter time-constant may consist, for example, of a low-pass integrator, indicated by resistor 33 and a capacitor 34 with a substantially smaller time-constant than the low-pass filter 29 with a resistor 31 and capacitor 32, and a high-pass differentiator, indicated by a capacitor 35 and a resistor 36. The additional control voltage derived in this manner is employed, after amplification in an amplifier 37, for controlling the phasing of the impulse driving the line output stage. For this purpose there may be introduced between the line oscillator 25 and the line outlet stage 26 a voltage-controlled phase shifter 38, the phase-shift introduced by which is controlled by the control voltage supplied by amplifier 37. A phase shifter of this kind may consist in known manner of RC elements which are constructed with voltage-variable capacitors, e.g., capacitor diodes. The resistors of the RC elements may also be made variable, by employing as these resistors transistors controlled by the control voltage.

In many cases the alteration of the phasing of the impulses driving the line output stage may also be effected by applying to the input of the line output stage impulses of which the amplitude is effected by the control voltage. As shown in FIG. 4, the bias voltage applied to the horizontal output stage may for this purpose be varied by the control voltage.

In the phase comparison stage 43 the horizontal synchronizing impulse of the television signal applied to it at 41 are compared with an impulse of line frequency derived from the scan generator and applied to the comparator at 42 in order to derive a control voltage dependent upon the phase difference, which is applied by way of a filter denoted by the resistor 51 and the capacitor 52 to the line oscillator, which is thus adjusted in such a manner as to reduce the phase difference. The horizontal deflection thus continues to be effective even during disturbances and even if the line synchronizing impulses fail.

In order that the horizontal deflection can also follow rapid irregular fluctuations in the timing of the synchronizing impulses, there is also derived as in FIG. 3 from the voltage developed by phase comparison, by way of a filter of shorter time constant, indicated by the resistor 53 and the capacitor 54, a second control voltage which is made use of the control the phasing of the impulses supplied by a line oscillator 45 to drive a line output stage 46. Since the leading edge of these impulses, which triggers the sawtooth current in the line output stage, possesses a definite rise-time, the initiation point of the sawtooth oscillation may be altered by shifting the position of the impulses on the characteristic of the line output stage. To this end the control voltage appearing on capacitor 54 is applied by way of a differentiator, consisting of a capacitor 55 and a resistor 56, to a point on the grid resistor, consisting of resistors 56 and 57, of the line output valve 58 so as to adjust the timing of the commencement of horizontal deflection.

Another possible way of equalizing timing errors consist in synchronizing the line output stage directly by the synchronizing impulses separated from the television signal by the synchronizing signal separator in the receiver. It is suitable for the synchronization to be effected, as illustrated in FIG. 5, by way of a path containing a gate circuit 63 which is opened by synchronizing impulses applied at 67 to the gate circuit 63 from the line oscillator, so that it is open only during the appearance of the synchronizing impulses.

The measures described above, the application of which is determined by the nature of the television receiver, require only a small additional expense in the television receiver, which is substantially less than that necessary in order to equalize the timing errors in the television signal taken from the magnetic tape.

Finally, FIG. 6 shows a block circuit diagram of a complete apparatus for the recording and playback of the video and audio signals of a television transmission by means of a television receiver of conventional construction, which contains the arrangement described above for the distortions less reproduction of the television signal played back from the magnetic tape. For recording, the high-frequency television signal coming from the antenna 91 is applied to the television receiver 90 and after amplification in high- and intermediate-frequency amplifiers 92 is demodulated by means of a demodulator 93. At the output of the demodulator there are available the video frequency picture signal and the audio signal in the form of a frequency-modulated difference carrier. These output signals from the demodulator pass by way of a lead 80 into a magnetic tape apparatus 70. During recording, the switch 71 is closed to conduct the signal to a recording amplifier 72. The output of the amplifier is connected to a magnetic head 73, which effects the recording on a magnetic tape 74. The magnetic tape is traversed in conventional manner past the magnetic head by means of a suitable transport device (not shown), being drawn from a feed spool 89*a* and wound upon a take-up spool 89*b*.

To playback the recording, the signal stored on the magnetic tape is taken from the magnetic tape by a Hall-effect reading head 81 and after amplification in a preamplifier 82 passes to a control amplifier 83 for equalizing amplitude fluctuations of the signal, which arise initially from changes in the separation between the magnetic tape 74 and the magnetic head 81. The control voltage for the control amplifier 83 is derived from the difference carrier, the amplitude of which has a constant nominal level since it is frequency modulated and therefore represents a measure of the signal level. For this purpose the frequency-modulated difference carrier is separated from the output signal of the control amplifier by means of a band-pass filter 84, and from this there is derived in a rectifier 85 a control voltage which, after smoothing in a filter 86 is applied to control the gain of control amplifier 83 in such a manner as to reduce the fluctuations in amplitude of the difference carrier and thus of the signals. In an alternative arrangement the signal is played back from the tape by means of an even harmonic transducer head and is converted into a carrier-frequency signal by feeding the harmonic transducer head with alternating current at half the desired carrier frequency.

In place of the control voltage being derived in the apparatus 70 from the signal taken from the magnetic tape and amplified, the equalization of the fluctuations in amplitude may also be effected in the receiver 90, as is described later.

In order to make use of the whole gain of the television receiver 90 for the amplification of the signal taken from the magnetic tape, the signal from preamplifier 82 may be applied directly to a modulator 87, in which the signal modulates the amplitude of a high-frequency oscillation taken from an oscillator 88. The frequency of the oscillator 88 is chosen to correspond with the frequency of the video carrier of a television channel, to which the receiver 90 can be tuned. The amplitude-modulated signal is conducted by way of a lead 100 to the input of the television receiver 90 and is processed in this same manner as the high-frequency signal from a radio transmitter. From the demodulator 93 the video signal passes into a video amplifier 94, the output of which feeds a picture tube 95, so that this tube reproduces the stored television picture signal taken from the magnetic tape 74. The difference carrier modulated with the audio signal passes into an intermediate-frequency amplifier 96 and is demodulated in a frequency discriminator 97. After further amplification in a low-frequency amplifier 98 the audio signal feed the loudspeaker 99 of the television receiver.

Equalization of the fluctuations in amplitude of the signal taken from the magnetic tape can also be effected in the television receiver. For this purpose the direct voltage from the frequency discriminator 97 constructed as a ratio detector, is applied by way of a lead 101 to control the gain of an intermediate-frequency amplifier 92, the lead 101 being connected by means of switch 103 to the intermediate-frequency amplifier in place of the lead 102. In this case the arrangement for gain control in the apparatus 70, consisting of the band-pass filter 84, the rectifier 85, the filter 86 and the control amplifier 93, may be omitted.

The deflection system of the television receiver 90, consisting of the amplitude filter 105 for separating the synchronizing signal from the demodulated television signal, of the vertical scan generator 106 and of the horizontal scan generator comprising a phase comparator 107, a filter 108, a line oscillator 109, an output stage 110 and deflection coils 111, is supplemented in such a manner that the horizontal deflection can also follow rapid, irregular changes in the phasing of the line synchronizing impulses in the television signal taken from the magnetic tape. For this purpose, as described above in relation to FIGURE 3, there is introduced between the line oscillator 109 and the output stage 110 a voltage-controlled phase shifter 112, by means of which the phasing of the drive pulses generated by the line oscillator 109 to drive the output stage 110 may be rapidly controlled in accordance with the changes in phase of the synchronizing impulses in the television signal. After the phase comparator 107 there is arranged a filter of short time-constant, denoted by a resistor 113 and a capacitor 114, as well as a differentiator formed by a capacitor 115 and a resistor 116, by means of which there is derived a control voltage for the phase shifter 112 which corrects the phasing of the drive impulses for the output stage 110. The arrangements described above in relation to FIGS. 4 and 5 may also be employed in place of the phase shifter 112.

What is claimed and desired to be secured by Letters Patent is:

1. Television signal recording apparatus comprising, in combination: a source of video signals within a predetermined lower frequency range accompanied by a carrier wave modulated by an audio signal and occupying a predetermined higher frequency range; an elongate magnetic record member, a magnetic transducer head having an exciter winding and including an operating gap of predetermined width engaging said record member to record signals thereupon; transport means operable to traverse said record member past said gap with a predetermined velocity such that the first zero frequency of the frequency characteristic determined by the width of said gap and the velocity of said record member falls between said lower and upper frequency ranges, and means operable to apply said signals from said source to said exciter winding.

2. Television signal recording apparatus comprising, in combination: television receiver means having an input terminal and including a demodulator having an output, said receiver means responding to a television transmission applied to said input terminal to yield at said modulator output a video signal having a predetermined lower frequency range and a carrier wave frequency modulated by an audio signal, said carrier wave occupying a predetermined higher frequency range; magnetic recording means including an elongate magnetic record member, a magnetic transducer head having an exciter winding and a gap of predetermined width, and transport means operable to traverse said record member past said gap in operative engagement therewith at a predetermined velocity, the width of said gap and said predetermined velocity being so chosen that the first zero frequency determined by the width of the gap and the velocity of the record member falls between said lower and upper frequency ranges; amplifier means having an input and an output; circuit means operable to connect signals from said demodulator to said amplifier input and circuit means applying signals from said amplifier output to said exciter winding.

3. Television signal reproducing apparatus comprising, in combination: an elongate magnetic record member having a television video signal recorded thereon in a predetermined lower frequency band and a carrier wave modulated with an audio signal recorded thereon in a predetermined higher frequency band; a reproducing head having a gap of predetermined width; tape transport means operable to traverse said record member past said gap in operative relation thereto at a predetermined speed such that the frequency characteristic determined by said gap width and said record speed has a first zero frequency intermediate said lower and upper frequency bands; together with means withdrawing said signals from said reproducing head.

4. Television signal reproducing apparatus in accordance with claim 3 wherein said reproducing head is a Hall-effect head having an exciter winding and a signal winding, said apparatus including also a source of alternating current and means applying said alternating current to said exciter winding.

5. Television signal reproducing apparatus in accordance with claim 4, together with a television receiver tunable to a predetermined carrier frequency and circuit means applying signals from said signal winding to said television receiver; the frequency of said alternating current being equal to said predetermined carrier frequency.

6. Apparatus for reproducing television signals from a magnetic tape record thereof comprising, in combination: an elongate magnetic record member having a television video signal recorded thereon in a predetermined lower frequency range and a carrier wave modulated in frequency with an audio signal recorded thereon in a predetermined upper frequency range; a reproducing head having a gap of predetermined width; transport means operable to traverse said record member past said gap in operative relation thereto at a predetermined velocity such that the first zero of the frequency characteristic determined by said gap width and said record velocity is intermediate said lower and upper frequency ranges; amplitude modulator means having a signal input, a carrier wave input and a modulated signal output; oscillator means generating a carrier oscillation; circuit means applying signals from said reproducing head to said signal input of said modulator; circuit means applying said carrier oscillation to said carrier wave input of said modulator; television receiver means tunable to a predetermined carrier frequency; and circuit means applying signals from said output of said modulator to said receiver means; said carrier oscillation having a frequency equal to said predetermined frequency.

7. Apparatus according to claim 6 in which said reproducing head is a Hall-effect head having an exciter winding and a signal winding; said apparatus including also a source of alternating current having a frequency equal to said predetermined frequency and means applying alternating current from said source to said exciter winding of said reproducing head.

8. Apparatus according to claim 6 in which said reproducing head is an even-harmonic head having an exciter winding and a signal winding; said apparatus including also a source of alternating current having a frequency equal to one half said predetermined frequency and circuit means applying alternating current from said source to said exciter winding.

9. Apparatus for the selective recording and reproduction of a television transmission comprising video and audio signals, said apparatus comprising in combination: television receiver means having an input terminal and a demodulator yielding in response to the application of said television transmission to said input terminal a video frequency picture signal having a predetermined lower frequency range and a carrier wave modulated with said audio signal and occupying a predetermined higher frequency range, said receiver being operable to respond to transmissions in a plurality of signal channels respectively; means selectively operable to apply a television transmission to said input terminal; magnetic recording means including an elongate magnetic record member, a magnetic recording head having an exciter winding and having an operating gap of predetermined width and transport means operable to traverse said record member past and in operative engagement with said gap at a predetermined velocity whereby said magnetic recording means has a predetermined frequency characteristic including a first zero frequency intermediate said lower and upper frequency ranges; means selectively operable to apply said video signal and said carrier wave from said demodulator to said exciter winding; a magnetic reproducing head disposed in operative engagement with said record member to reproduce signals therefrom; modulator means having a modulating signal input, a carrier wave input and a modulated carrier output; an oscillator generating a carrier signal having a frequency appropriate to a said signal channel; means connecting said carrier signal from said oscillator to said carrier input of said modulator; means connecting signals from said reproducing head to said modulating signal input of said modulator; and means selectively applying signals from said modulator output to said television receiver input.

10. Apparatus in accordance with claim 9 in which said means applying said signal from said reproducing head to said modulator input includes a gain-controlled amplifier; together with band-pass filter means having an input and an output, said filter having a pass range including said upper frequency range; means applying signals from said reproducing head to said filter input; rectifier means; means applying signals from said filter output to said rectifier means to develop a control voltage; and means applying said control voltage to control the gain of said amplifier thereby to reduce spurious fluctuations in the amplitude of signals applied to said modulator from said reproducing head.

11. Apparatus in accordance with claim 9 wherein said television receiver means includes a ratio detector responsive to said frequency-modulated carrier to yield a direct output voltage representative of the amplitude thereof and wherein said means applying said signal from said reproducing head to said modulator includes a gain-controlled amplifier; together with means applying said direct voltage to control the gain of said amplifier thereby to reduce spurious fluctuations in the amplitude of said signal.

12. Apparatus in accordance with claim 9 wherein said television receiver includes in addition to said demodulator means responsive to an applied radio television transmission to yield a video frequency picture signal and a carrier wave frequency modulated with an audio signal, video amplifier means; a picture display tube wherein an electron beam is produced; means applying said video signal from said demodulator to said amplifier; means applying amplified video signal from said amplifier to said picture tube; separator means operable to separate line synchronizing signals from an applied picture signal; means applying said picture signal to said separator means; line scan generator means operable to generate line deflection signals; deflector means associated with said picture tube to produce deflection of said electron beam; means applying said line deflection signals to said deflector means to produce line deflection of said electron beam; said line scan generator including a voltage-controlled oscillator yielding line frequency signals; comparator means yielding a phase control voltage related to the phase relation between applied signals; means applying said line synchronizing signals and said line frequency signals to said comparator; means including filter means of having a predetermined longer time-constant applying said phase control voltage to control said oscillator frequency; a line output stage; means including voltage-controlled phase shifter means applying signals from said oscillator to drive said output stage; and means including filter means having a predetermined shorter time-constant applying said control voltage to control said phase shifter thereby to reduce undesirable jitter in said horizontal deflection.

13. Apparatus in accordance with claim 12 wherein said television receiver includes in addition to said demodulator means responsive to an applied radio television transmission to yield a video frequency picture signal and a carrier wave frequency modulated with an audio signal, video amplifier means; a picture display tube wherein an electron beam is produced; means applying said video signal from said demodulator to said amplifier; means applying amplified video signal from said amplifier to said picture tube; separator means operable to separate line synchronizing signals from an applied picture signal; means applying said picture signal to said separator means; line scan generator means operable to generate line deflection signals; deflector means associated with said picture tube to produce deflection of said electron beam; means applying said line deflection signals to said deflector means to produce line deflection of said electron beam; said line scan generator including a voltage-controlled oscillator yielding line frequency signals; comparator means yielding a phase control voltage related to the phase relation between applied signals; means applying said line synchronizing signals and said line frequency signals to said comparator; means including filter means of having a predetermined longer time-constant applying said phase control voltage to control said oscillator frequency; a line output stage; means including voltage-controlled gating means applying said line synchronizing signals to control said output stage; and means applying said line frequency signals from said oscillator to control said gating means.

References Cited

UNITED STATES PATENTS 2,867,693 6/1959 Raisbeck ---------- 178—6.6

ROBERT L. GRIFFIN, *Primary Examiner.*

H. W. BRITTON, *Assistant Examiner.*